United States Patent [19]

Bright

[11] 4,076,671

[45] Feb. 28, 1978

[54] FAST CURING RESINOUS COMPOSITIONS

[75] Inventor: Alan Bright, Washington, England

[73] Assignee: Rohm and Haas Company, Philadelphia, Pa.

[21] Appl. No.: 651,916

[22] Filed: Jan. 23, 1976

[30] Foreign Application Priority Data

Jan. 24, 1975 United Kingdom ................. 3222/75

[51] Int. Cl.$^2$ ............................................. C08L 91/00
[52] U.S. Cl. ....................... 260/28.5 AV; 260/28.5 R; 260/42; 260/42.18; 260/42.21; 260/42.43; 260/42.41; 260/885; 427/137; 428/451; 428/489

[58] Field of Search .......... 260/885, 28.5 R, 28.5 AV, 260/42.41, 42, 42.18, 42.21, 42.43; 427/137; 428/451, 489

[56] References Cited

U.S. PATENT DOCUMENTS

| 3,620,796 | 11/1971 | Gordy | 260/28.5 AV |
|---|---|---|---|
| 3,770,490 | 11/1973 | Parker | 260/885 |
| 3,895,082 | 7/1975 | Hochberg | 260/885 |

Primary Examiner—Melvyn I. Marquis

[57] ABSTRACT

Coating compositions, useful for marking trafficable surfaces such as roads, are disclosed and claimed which comprise a polymer-monomer mixture and a catalyst system. The relative amounts of the components are chosen so as to provide compositions which have, surprisingly, a desirable balance of stability and fast cure.

20 Claims, No Drawings

FAST CURING RESINOUS COMPOSITIONS

This invention is concerned with liquid coating compositions useful in marking trafficable surfaces, particularly road surfaces, and methods for their preparation. By "trafficable surfaces" is meant fabricated surfaces for use by traffic, indoors or outdoors, including for example, roads, runways or industrial floors. In the art compositions used to mark such surfaces are known as road traffic paints. Hitherto acrylic traffic paints have suffered from the disadvantage of having relatively long cure times, of the order of 45 minutes or more, and/or tending to be unstable so that they are difficult to store and to use. Lengthy cure times result in the disadvantage of necessitating closure of the road to traffic for an appreciable length of time. By "cure time" is meant the time from formulation of the paint to the time when it is capable of withstanding traffic.

We have now found that coating compositions suitable for use in traffic paints, can be provided which have, not only highly desirable physical properties, but also a cure time of less than five minutes.

According to the invention there are provided fast curing coating compositions comprising:

(A) a polymer-monomer mixture comprising:
  (a) at least 25% by weight of polymer containing mers of one or more acrylic and/or methacrylic esters;
  (b) at least 30% by weight of one or more ethylenically unsaturated polymerisable monomers;
  (c) 1 – 40% by weight of at least one compound containing at least two ethylenically unsaturated groups per molecule;
optionally,
  (d) 0.5 – 3% by weight of ethylenically unsaturated carboxylic acid;
optionally,
  (e) 0.25 –1% by weight of paraffin wax;
and,
(B) a catalyst system comprising:
  (a) 0.5 – 10% by weight, based on the weight of polymer-monomer mixture (A), of organic peroxide as catalyst;
  (b) 0.1 – 10% by weight, based on the weight of the polymer-monomer mixture (A), of tertiary amine as accelerator.

By "fast curing coating composition" is meant a composition which may be conveniently applied to a road surface and if so applied at ambient temperature or elevated temperature of, for example, up to 150° C, has a cure time, as hereinbefore defined, of less than five minutes. Preferably the cure time is less than 2 1/2 minutes, most preferably less than 1 minute.

It will be appreciated that, above the minimum amounts indicated, the precise amount of each component is not critical, provided that the cure time of the coating composition is less than five minutes. For example any one or more of the parameters: initial temperature, amount of acrylic polymer, crosslinking agent, catalyst and accelerator may be varied so as to provide the compositions of the invention. Furthermore the components and their amounts may be varied so as to adapt the resultant coating composition to needs of a particular road paint such as weatherability, toughness and resistance to studded tyres in cold climates. For example, monomers such as methylmethacrylate tend to provide toughness in the cured composition, while ethyl or butyl acrylates tend to provide flexibility. Characteristics such as hardness and/or flexibility which may be imparted to the cured composition by acrylates, methacrylates or other monomers are well known in the art.

Preferably component (a) comprises at least one homopolymer or copolymer of one or more ($C_1$–$C_8$)-alkyl acrylates and/or ($C_1$–$C_8$)-alkyl methacrylates, more preferably ($C_1$–$C_4$)-alkyl acrylates or methacrylates.

The amount of component (a) in the polymer-monomer mixture may be such as to provide an auto acceleration mechanism in the polymerisation, which tends to decrease the cure time.

Preferably component (a) comprises at least 30%, more preferably from 30 to 50 weight percent of the polymer-monomer mixture.

Alkyl acrylates or methacrylates are preferred as copolymerisable monomer with the polymeric component (a) because of the advantageous properties they confer on the cured coating compositions such as durability, toughness and resilience. More preferably component (b) comprises one or more ($C_1$–$C_8$)-alkyl acrylates and/or methacrylates, most preferably one or more ($C_1$–$C_4$)-alkyl acrylates and/or methacrylates. The amount of component (b) is preferably from 40 to 60 weight percent of the polymer-monomer mixture.

Component (c) acts as a cross-linking agent in the polymerising mixture and may be a conventional cross-linking agent such as divinyl benzene or diallylphthalate, but it is preferred that the compound contain a plurality of acrylate or methacrylate groups which retain their ethylenic unsaturation in the compound and are thereby capable of cross-linking.

Examples of such compounds include dimethylolpropane dimethacrylate, trimethylolpropanetriacrylate, trimethylolpropanetrimethacrylate, pentamethylolpropanepentamethacrylate, pentaerythritol triacrylate and dipentaerythritolpentacrylate. More preferred are the corresponding methacrylate-substituted compounds, especially trimethylolpropanetrimethacrylate.

The cross-linking agent preferably comprises from 2 to 20 weight percent, more preferably 4 to 10 weight percent, of the polymer-monomer mixture.

The catalyst system is a redox system comprising a catalyst and an acclerator. The catalyst is preferably a peroxide such as benzoyl peroxide, while the acclerator is preferably a tertiary amine. Examples of suitable tertiary amines include N,N'-dimethyl-p-toluidine, N,N'-dimethylaniline, N,N'-dihydroxyethyl-p-toluidine and N,N'-bis-2-hydroxy-p-toluidine. Most preferred is N,N'-dimethyl-p-toluidine.

The amounts of catalyst and accelerator are selected so as to produce the required short cure time. Generally the catalyst comprises from 0.5 to 10 weight percent, and the accelerator from 0.1 to 10 weight percent, based on the polymer-monomer mixture. Preferably the catalyst comprises from 2 to 7 weight percent, while the accelerator comprises from 0.5 to 10 weight percent, more preferably from 1 to 5 weight percent.

If desired, a small amount of an ethylenically unsaturated carboxylic acid may be included in the mixture. Glass beads are commonly included in traffic paints as light reflectors and the inclusion of such as acid in the paint formulation tends to aid the adhesion of the cured composition to such beads. It has also been found that the acid may reduce the time taken for paint composition to become non-tacky.

Any ethylenically unsaturated acid may be used, but acrylic and methacrylic acids are preferred, especially methacrylic acid.

This component may conveniently comprise from 0.5 to 3, preferably 1 to 2, weight percent of the polymer-monomer mixture.

To prevent inhibition of the polymerising mixture by atmospheric oxygen a small amount, usually of the order of 0.5 weight percent of the polymer-monomer mixture, of paraffin wax, may be included in the mixture. The wax is sparingly soluble in the mixture and, as polymerisation proceeds, tends to migrate out of solution and form a film (i.e. barrier) between the polymerisate and the atmosphere.

The coating compositions of the invention may also contain other additives well known in the art. For example glass beads, as previously mentioned, pigments, fillers and dispersants may be included in the compositions.

One embodiment of the invention provides coating compositions which comprise a mixture of components (a), (b), (c) and, if present, (d) and/or (e), split into two portions, one portion containing the accelerator and the other the catalyst. Preferably, for stability of the composition, the catalyst is added to its respective portion just before use of the composition.

In another embodiment of the invention coating compositions are provided which may have improved storage stability. Such a composition comprises three portions: a mixture of components (a), (b) and, if present, (d) and/or (e), split into two portions, one portion containing all the accelerator and the other all the cross-linking agent, and as the third portion the catalyst.

In a preferred embodiment storage stability of the pre-accelerated portion may be improved by the inclusion of a polymerisation inhibitor. Any convenient polymerisation inhibitor may be used, provided the cure time is not seriously lengthened. The amount of inhibitor required will depend on the individual composition and the inhibitor used. Generally satisfactory inhibition will be achieved by the use of from 50 to 200 ppm, preferably from 80 to 100 ppm, based on the total polymer-monomer mixture.

Examples of suitable inhibitors include the methyl ether of hydroquinone and phenothiazine. A preferred inhibitor is the methyl ether of hydroquinone.

The above coating compositions comprising separate portions of the components may, of course, also contain conventional additives well known in the art. Such additives may be added to the compositions at any convenient time.

The portions of the coating composition may be admixed by any suitable combinations in the coating process such as immediately before application of the composition to the road surface or on the road surface itself, and the coatings of the invention may be formed, for example, by spray techniques such as the combination of a number of spray streams.

The coating compositions of the invention when applied to trafficable surfaces may have a desirable balance of properties including, for example, good adhesion to all types of road surfacing materials, e.g. concrete or asphalt; colour and light fastness to meet the requirements of accepted road marking standards; durability sufficient to withstand, in service, road surface temperatures ranging from −30° C to +80° C; ability to last for long periods under normal traffic conditions or, in locations where studded tyres are used, ability to withstand excessive wear for a minimum of one year; resistance in service to petrol, kerosene and lubricating oils; resistance to soiling by the embedding or adhering of road dust and the ability to accept and hold a surface application of glass ballotini and to retain ballotini against the action of traffic.

In general, the marking compositions of the invention may comprise:
(a) binder, comprising a polymer-monomer mixture and a catalyst/accelerator system, as hereinbefore described;
(b) pigment, for example titanium dioxide for white markings or lead chrome or an organic pigment for yellow markings; and optionally:
(c) extender, for example whiting or silica flour;
(d) ballotini, if the markings are required to be retro-reflective;
(e) aggregate of light colour, for example crushed marble, silica sand, calcined flint, cristobalite or crushed quartz.

The range of usable compositions will generally fall within the following proportions by weight:

| | |
|---|---|
| Binder: | 20 – 80% |
| Pigment + extender: | 5 – 80% |
| Ballotini: | 0 – 30% |
| Aggregate: | to 100% |

The pigment content is generally in the range 1 –25%.

The maximum particle size of the aggregate is chosen in relation to the desired thickness of the road marking line and the degree of surface texture required. A good degree of surface texture is necessary to give a high level of skidding resistance under wet conditions. Where this degree of surface texture is required the maximum particle size of the aggregate should be just less than the designed line thickness.

Satisfactory road marking compositions can also be produced without any aggregate in which case the material is paint-like in consistency.

Where reflectorised markings are required the ballotini can be incorporated in the composition during manufacture or alternatively part or all of the ballotini can be applied into and/or onto the line during application thereof.

Besides the ingredients mentioned above other additives such as are commonly used in the formulation of road marking compositions may also be incorporated in the material: e.g. suspending agents such as fumed silica, dispersing or wetting agents, matting agents to reduce surface gloss, waxes to reduce surface tack or anti-oxidants to give storage stability.

Preferred embodiments of the invention will now be described in the following Examples which are given for the purposes of illustration only and in which all parts and percentages are by weight and all temperatures are in degrees centigrade, unless otherwise stated.

EXAMPLE 1

A polymer-monomer mixture was prepared from the following components:
30 weight percent (on total polymers and monomers) of polymer containing mers derived from a monomer mixture of methyl methacrylate and ethyl acrylate in the weight ratio of 2.33 parts to 1 part by weight respectively,
40.5 weight percent of methyl methacrylate, 28.0 weight percent of butyl acrylate, and 0.5 weight percent of paraffin wax.

Trimethylolpropanetrimethacrylate cross-linker was added to the mixture in the amounts indicated in Table 1 below, at a constant percentage of polymer and with a constant weight ratio of butyl acrylate to methyl methacrylate.

The resultant mixture was then divided into two equal portions, 5 weight percent of benzoyl peroxide (catalyst) added to one portion and 1.8 weight percent dimethyl-p-toluidine (accelerator) (based on total polymers and monomers) added to the other portion.

Each portion was then mixed with pigment and extender totalling 8 percent and 60 percent respectively, (based on the weight of polymers and monomers).

The portions were brought to the required initial temperature, mixed together and immediately applied to a road surface in a coating having a thickness of 2 – 3 mm.

In Table 1 below the effect of various levels of cross-linker (trimethylolpropanetrimethacrylate) and variation of initial temperature are shown. It should be noted, however, that since polymerisation is so rapid it is very difficult to measure the cure times precisely and consequently the figures reported are approximate values.

Table 1

| % Cross-linker | Cure Time (mins.) | Initial Temp.° C. |
| --- | --- | --- |
| 2.5 | 7–8 | 20 |
| 6 | 3.5–4 | 20 |
| 6 | 2.5 | 60 |
| 7.5 | 2 | 60 |
| 9.5 | 2.2–2.5 | 20 |
| 20 | 1.1–1.3 | 20 |

The coatings possessed excellent properties as road paints having good abrasion resistance, toughness and weatherability.

It can be seen that to achieve the coating compositions of the invention the amount of cross-linker and/or the initial temperature may be selected so as to provide compositions having a cure time of less than five minutes.

EXAMPLE 2

Road paint compositions were prepared as described in Example 1, except that the polymer in the polymer-monomer mixture contained mers derived from a monomer mixture comprising methyl methacrylate and ethyl acrylate in the weight ratio of 1.21 to 1 respectively. The results are shown in Table 2 below.

Table 2

| % Cross-linker | Cure Time (mins.) | Initial Temp. ° C. |
| --- | --- | --- |
| 2.5 | 8 | 20 |
| 12 | 3.5 | 20 |
| 27 | 0.75 | 20 |

EXAMPLE 3

Road paint compositions were prepared as described in Example 1, except that the accelerator dimethyl-p-toluidine was replaced by dimethylaniline, with the following results.

Table 3

| % Cross-linker | Approx. Cure Time (mins.) | Initial Temp. ° C. |
| --- | --- | --- |
| 4 | 9.2 | 30 |
| 12 | 5.6 | 30 |

Table 3-continued

| % Cross-linker | Approx. Cure Time (mins.) | Initial Temp. ° C. |
| --- | --- | --- |
| 18 | 5.0 | 30 |
| 24 | 4.6 | 30 |
| 40 | 3.6 | 30 |

It can be seen that dimethylaniline is less efficient in producing the required cure times than the preferred accelerator dimethyl-p-toluidine. Nevertheless suitable cure times may be achieved by careful selection of the amount of dimethylaniline used.

EXAMPLE 4

Cure times according to the invention may be achieved not only by suitable selection of the amount of cross-linker and/or initial temperature but also by selection of the amount of catalyst, as demonstrated below.

A polymer-monomer mixture was prepared containing 30 weight percent of polymer containing mers derived from a monomer mixture comprising methyl methacrylate and ethyl acrylate in the weight ratio of 2.33 to 1 respectively, 40.5 weight percent of methyl methacrylate, 28.0 weight percent of butyl acrylate, 9 weight percent of trimethylolpropanetrimethacrylate and 0.5 weight percent of paraffin wax.

The road paint composition was prepared according to the method of Example 1, except that as accelerator 1.9% N,N'-dimethyl-p-toluidine was used and the amount of catalyst was varied as follows:

Table 4

| % Benzoyl Peroxide | Cure Time (mins.) | Initial Temp.° C. |
| --- | --- | --- |
| 10.0 | 1.85 | 30 |
| 6.25 | 2.00 | 30 |
| 5.00 | 2.45 | 30 |
| 3.75 | 3.05 | 30 |
| 2.00 | 4.50 | 30 |
| 0.50 | 6.00 | 30 |

EXAMPLE 5

Similarly the amount of accelerator used may be varied to produce compositions according to the invention having low cure times as shown below. Road paint compositions were prepared as in Example 4 but contained 9 percent trimethylolpropanetrimethacrylate and 6.25 percent benzoyl peroxide (based on total weight of polymers and monomers).

Table 5

| % Accelerator (N,N'-dimethyl-p-toluidine | Cure Time (mins.) | Initial Temp. ° C. |
| --- | --- | --- |
| 9.4 | 0.65 | 30 |
| 4.7 | 1.00 | " |
| 2.5 | 1.50 | " |
| 1.9 | 2.00 | " |
| 0.95 | 3.20 | " |
| 0.50 | 4.45 | " |

EXAMPLE 6

The amount of polymer used in the polymer-monomer mixture may be varied. Increased levels of polymer tend to produce shorter cure times in the resultant coating composition.

In the manner previously described the following compositions were prepared:

(i) 32 weight percent of polymer A (containing mers derived from a monomer mixture of methyl methacrylate and ethyl acrylate in the weight ratio of 2.33 to 1, respectively), 37.2 weight percent of methyl methacrylate, 26.0 weight percent of butyl acrylate, 4 weight percent of trimethylolpropanetrimethacrylate, 0.5 weight percent paraffin wax, 6.0 weight percent (based on the polymer-monomer charge) benzoyl peroxide, and 2.5 weight percent (based on the polymer-monomer charge) N,N'-dimethyl-p-toluidine.

(ii) as (i) above with 40 weight percent of polymer A and the weight ratio of butyl acrylate to methyl acrylate as in (i).

The compositions were divided into two equal portions, one containing all the catalyst, the other containing all the accelerator, and mixed with pigment and extended as described in Example 1.

Composition (i) had a cure time of 5 minutes while composition (ii) had a cure time of 3 minutes.

EXAMPLE 7

Following Example 6 the amount of trimethylolpropanetrimethacrylate and the amount of polymer was varied as shown below in Table 6.

Polymer B contained mers derived from a monomer mixture comprising iso-butyl methacrylate and t-butylaminoethylmethacrylate in the weight ratio of 32.1 to 1, respectively.

Table 6

| Polymer | % Polymer | % Cross-linker | Cure Time (mins) | Initial Temp. °C. |
|---|---|---|---|---|
| B | 30 | 0 | 11 | 22 |
| B | 40 | 0 | 8 | 22 |
| B | 50 | 0 | 6 | 22 |
| B | 48 | 4.5 | 0.8–0.9 | 60 |
| B | 46 | 9.0 | 1.2 | 22 |
| A | 38 | 4.5 | 3 | 22 |
| A | 30 | 4.5 | 5 | 22 |
| A | 32 | 10.0 | 0.9 | 60 |
| A | 32 | 20.0 | 1.2 | 22 |

The weight ratio of butyl acrylate to methyl methacrylate was kept constant throughout the compositions above in the same ratio as in Example 6.

EXAMPLE 8

As stated previously various cross-linking agents may be used, with judicious selection of other parameters, in order to provide the compositions of the invention.

Various cross-linking agents were used in the following road paint formulation which was used to provide a coating on a road surface.

A polymer-monomer mixture was prepared from:

32 weight percent of polymer containing mers derived from a monomer mix of methyl methacrylate and ethyl acrylate in the weight ratio of 2.33 to 1.

36 weight percent methyl methacrylate 24 weight percent butyl acrylate 1 weight percent glacial methacrylic acid 7 weight percent cross-linker.

The mixture was brought to an initial temperature of 20° C. and divided into two equal portions. To one was added 6 percent benzoyl peroxide, to the other 2.2 percent (based on the total weight of the mixture) dimethyl-p-toluidine.

Other additives were then added, in equal amounts to each portion so that the overall composition comprised:

30 weight percent polymer-monomer mixture plus a catalyst sustem 7 weight percent titanium dioxide 23 weight percent whiting 40 weight percent aggregate.

The two portions were mixed together and immediately applied to a road surface.

The variation of cure time with various cross-linking agents was as follows:

Table 7

| Cross-linker | Cure Time (mins.) |
|---|---|
| Polyethylene glycol dimethacrylate | 3.0 |
| 1,3-butylene dimethacrylate | 2.83 |
| Trimethylolpropanetrimethacrylate | 1.83 |
| Trimethylolpropanetriacrylate | 2.25 |
| Pentaerythritol Triacrylate | 2.42 |
| Pentaerythritol Tetraacrylate | 2.0 |
| Dipentaerythritol Pentaacrylate | 1.66 |

EXAMPLE 9

Using the method and formulation of Example 8 the accelerator used was varied, while the crosslinker was 7 percent of the polymer-monomer mixture of trimethylolpropanetrimethacrylate. The resultant cure times are tabulated in Table 8 below.

Table 8

| Accelerator | Cure Time (mins.) |
|---|---|
| N,N'-Dimethylaniline | 3.92 |
| N,N'-Dimethyl-p-toluidine | 1.83 |
| N,N'-Bis-2-hydroxy-p-toluidine | 1.58 |

The following examples illustrate suitable compositions according to the invention for marking trafficable surfaces.

EXAMPLE 10

| | With aggregate Overall composition by weight: | |
|---|---|---|
| Binder: | | 38.7% |
| Polymer-monomer mixture | 35.0) | |
| *DMT Accelerator | 0.2) | |
| Benzoyl peroxide paste | 3.5) | (50% active) |
| Titanium dioxide | | 6.0% |
| Whiting | | 10.0% |
| Fumed silica | | 0.3% |
| Crushed marble (passing 36 mesh) | | 45.0% |
| (*N,N-Dimethyltoluidine) | | |

This composition can be used conveniently by preparing a two component system as follows:

| Component A | | | |
|---|---|---|---|
| | Polymer-monomer mixture A | 19.15 | parts |
| | DMT Accelerator | 0.2 | parts |
| | Titanium dioxide | 3 | parts |
| | Whiting | 5 | parts |
| | Fumed silica | 0.15 | parts |
| | Crushed marble | 22.5 | parts |
| Component B | | | |
| | Polymer-monomer mixture B | 15.85 | parts |
| | Benzoyl peroxide paste | 3.5 | parts |
| | Titanium dioxide | 3 | parts |
| | Whiting | 5 | parts |
| | Fumed silica | 0.15 | parts |
| | Crushed marble | 22.5 | parts |

Component A may be stable on storage for at least one month at ambient temperatures, while component B may have a storage life of about 1 week. In practice if a longer storage life is required the benzoyl peroxide paste should be omitted from the manufactured components and subsequently added on site to the other preblended ingredients of component B in sufficient quantities for several days work.

For application the components may be warmed to 35° – 40° C to improve their fluidity, blended at a ratio of 1:1 by weight or volume and sprayed immediately onto the road.

EXAMPLE 11

| | Without aggregate Overall composition by weight: | |
|---|---|---|
| Binder: | | 65.0% |
| Polymer-monomer mixture | 61.3) | |
| DMT Accelerator | 0.2) | |
| Benzoyl peroxide suspension | 3.5) | (50% active) |
| Titanium dioxide | | 5.0% |
| Coated whiting (Omya BLP2) | | 30.0% |

This composition can be reproportioned as two components in similar fashion to that of Example 10. Alternatively, all the ingredients except the benzoyl peroxide suspension can be blended together and the liquid benzoyl peroxide suspension added as the second component at the time of application.

It is believed that sufficient information is given in the preceding Examples to enable a man skilled in the art to formulate, by simple trial and experiment, compositions which may meet his specific requirements and which are also fast curing compositions according to the invention.

What we claim is:

1. A coating composition which comprises:
   (A) a polymer-monomer mixture comprising:
      (a) at least 25% by weight of a homopolymer or copolymer of one or more ($C_1$–$C_8$)-alkyl esters of acrylic acid or methacrylic acid;
      (b) at least 30% by weight of one or more ethylenically unsaturated polymerizable monomers comprising one or more ($C_1$–$C_8$)-alkyl esters of acrylic acid or methacrylic acid;
      (c) 1–40% by weight of at least one compound containing at least two ethylenically unsaturated groups per molecule;
   optionally,
      (d) 0.5–3% by weight of ethylenically unsaturated carboxylic acid;
   optionally,
      (e) 0.25–1% by weight of paraffin wax;
   and,
   (B) a catalyst system comprising:
      (a) 0.5–10% by weight, based on the weight of polymer-monomer mixture (A), of organic peroxide as catalyst;
      (b) 0.1–10% by weight, based on the weight of the polymer-monomer mixture (A), of tertiary amine as accelerator; the relative amounts of the components being chosen so as to give a fast-curing composition, as hereinbefore defined.

2. A composition as claimed in claim 1 wherein component (A)(b) comprises from 40 to 60 weight percent of the polymer-monomer mixture.

3. A composition as claimed in claim 1 wherein component (A)(c) comprises at least one compound containing a plurality of acrylate or methacrylate groups which retain their ethylenic unsaturation in the compound and are thereby capable of cross-linking.

4. A composition as claimed in claim 3 wherein component (A)(c) comprises one or more of dimethylolpropane dimethacrylate, trimethylolpropanetriacrylate, trimethylolpropanetrimethacrylate, pentamethylolpropanepentamethacrylate pentaerythritol triacrylate and dipentaerythritolpentacrylate.

5. A composition as claimed in claim 3 which also contains at least one polymerisation inhibitor.

6. A roadmarking composition which comprises the composition as claimed in claim 3 and one or more of the following adjuvants: pigment, filler, dispersant, reflectant, extender, aggregate, suspending agent, dispersing or wetting agent, matting agent, surface tack reducer, and antioxidant.

7. A roadmarking composition as claimed in claim 6 in which the pigment is selected from titanium dioxide, lead chrome or an organic pigment, the reflectant is ballitoni, the extender is whiting or silica flour, the aggregate is selected from crushed marble, silica sand, calcined flint, cristobalite, and crushed quartz, and the surface tack reducer is wax.

8. A composition as claimed in claim 1 which comprises a mixture of components (a), (b), (c) and, if present, (d) and/or (e) split into two portions, one portion containing the accelerator and the other the catalyst.

9. A method of marking a trafficable surface comprising combining the two portions of the composition of claim 8, and substantially simultaneously applying the same to said surface as a traffic marking, and curing the coating on said surface.

10. A trafficable surface marked by the method of claim 9.

11. A composition as claimed in claim 1 which comprises three portions: a mixture of components (a), (b) and, if present, (d) and/or (e) split into two portions, one portion containing all the accelerator and the other all the cross-linking agent, and as the third portion the catalyst.

12. A method of marking a trafficable surface comprising combining the two portions of the composition of claim 11, and substantially simultaneously applying the same to said surface as a traffic marking, and curing the coating on said surface.

13. A trafficable surface marked by the method of claim 12.

14. A composition as claimed in claim 3 wherein component (A)(c) comprises from 2 to 20 weight percent of the polymer-monomer mixture.

15. A composition as claimed in claim 14 wherein component (A)(c) comprises from 4 to 10 weight percent of the polymer-monomer mixture.

16. A composition as claimed in claim 15 wherein component (B)(b) comprises one or more of N,N'-dimethyl-p-toluidine, N,N'-dimethylaniline, N,N'-dihydroxyethyl-p-toluidine and N,N'-bis-2-hydroxy-p-toluidine.

17. A composition as claimed in claim 16 wherein component (B)(a) comprises from 2 to 7 percent by weight of the polymer-monomer mixture.

18. A composition as claimed in claim 17 wherein component (B)(b) comprises from 0.5 to 10 percent by weight of the polymer-monomer mixture.

19. A composition as claimed in claim 18 wherein component (B)(b) comprises from 1 to 5 percent by weight of the polymer-monomer mixture.

20. A composition as claimed in claim 14 wherein component (B)(a) comprises benzoyl peroxide.

* * * * *